April 4, 1961 G. I. FREDRIKSON 2,978,188
DISCHARGE VALVES FOR MILK AND OTHER FOAMING LIQUIDS
Filed Feb. 13, 1958 2 Sheets-Sheet 2

Inventor
G. I. Fredrikson
By Glascock Downing Teebold
Attys.

2,978,188

DISCHARGE VALVES FOR MILK AND OTHER FOAMING LIQUIDS

Gustav Ivar Fredrikson, Tuledet, Vadstena, Sweden

Filed Feb. 13, 1958, Ser. No. 715,085

6 Claims. (Cl. 239—575)

This invention refers to discharge valves for discharging milk and other foaming liquids into shipping vessels especially sheet metal.

In general, such discharge or filling valves comprise a casing or box having a lateral inlet for the liquid, a downwardly directed outlet, a screen in said outlet consisting of close-mesh sieves of wire netting, a valve seat in the outlet above the screen, and a valve element mounted above said valve seat and operable by external control means.

A serious objection to discharge valves of constructions heretofore used is the following. Upon closure of the valve, there will remain a quantity of milk in the rather large space present between the screen and valve seat together with the valve element, and this milk will ultimately drip out and contaminate the parts which are located under the valve. The disadvantage is especially pronounced when the valve unit is moved laterally, as in the case where milk is to be discharged into cans standing on a conveyor advancing clean cans.

In case of stationary valve units, an attempt has been made to avoid the contamination caused by milk dripping down from the valve, by providing a drip pan below the valve, with the drip pan having an outlet conduit extending to a collecting vessel located laterally with respect to the valve. However, such drip pans are not quite sufficient since the milk will spray or splash even from the drip pan, apart from the fact that such drip pans cannot be used in combination with laterally moving valve units for discharging the milk into cans standing on moving conveyors.

An object of the invention is to provide a discharge valve of such improved structure that there is no possibility for the liquid to drop down from the valve unit upon closure of the same so that the parts lying below the valve unit cannot be contaminated irrespectively of the provision of a drip pan and regardless of whether the valve is or is not movable laterally.

Another object of the invention is to prevent sprinkling or splashing by obtaining the formation of a concentrated jet of liquid delivered through the screen.

A main feature of the invention relates to the provision of a screen immediately below the valve seat and the construction of the screen as a unit comprising a package of a plurality of close-mesh sieves which by suitable distance means are spaced at least in their central portions. This feature effects a reduction of the weight of the liquid column which upon the closure of the valve remains between the screen unit and valve seat together with valve element, as well as an increase of the effect of the cohesive force and the surface tension of the liquid which is within the screen unit, viz. within the meshes and other spaces of the same, so that a non-dropping valve is provided.

An additional feature relates to a structure of the screen unit, rendering the same convex at least at the outer face or bottom face of the same. Thus, the jet will obtain a conically concentrated shape, avoiding splashing and assisting in rendering the valve non-dropping. A conical shape of the top face of the screen unit will facilitate the provision of a small space between the top face of the screen unit and the lower side of the valve seat.

Further features and objects of the invention will appear from the following specification when read in conjunction with the accompanying drawings in which one embodiment of the invention is illustrated by way of example.

Figure 1:
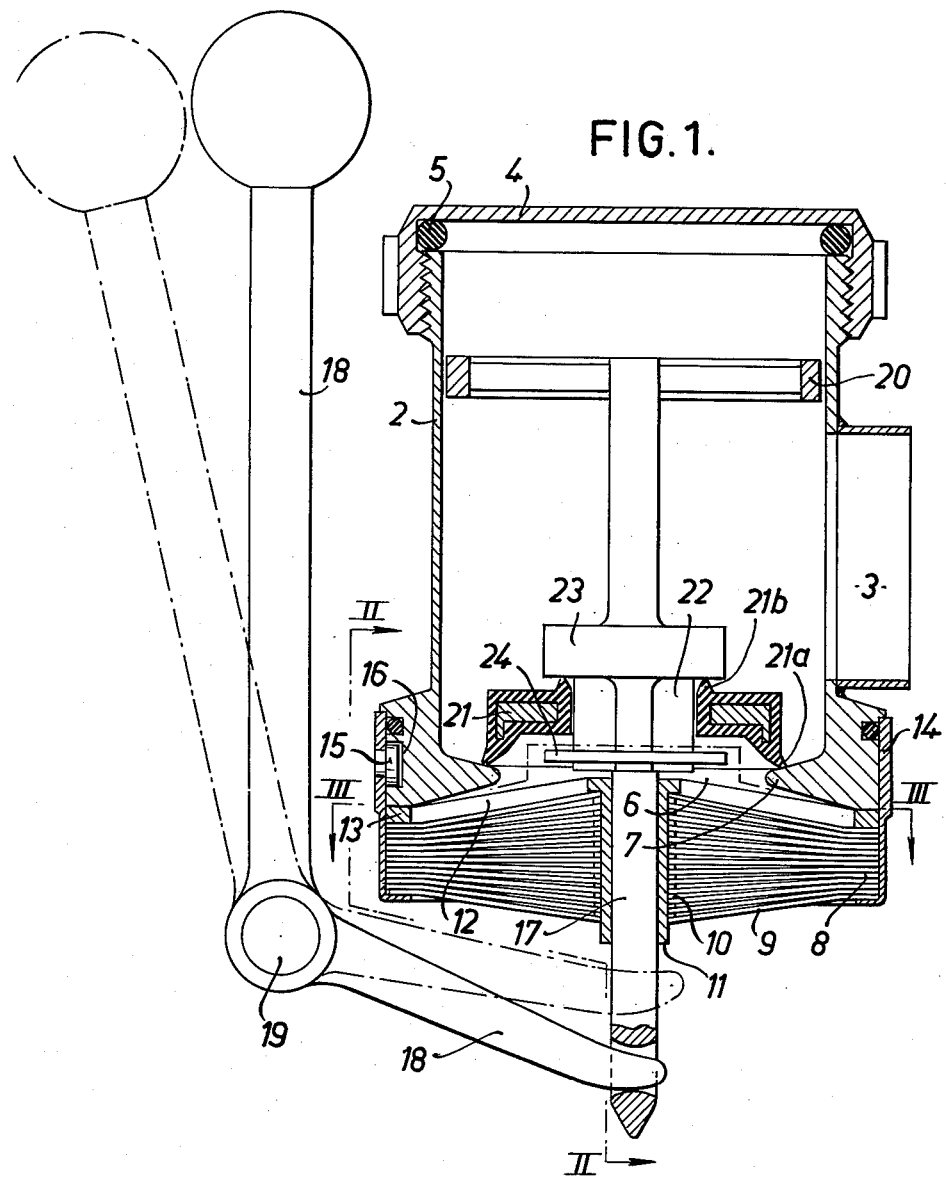
Fig. 1 is a central vertical cross-section through the discharge valve proper together with some associated parts.
Figure 2:
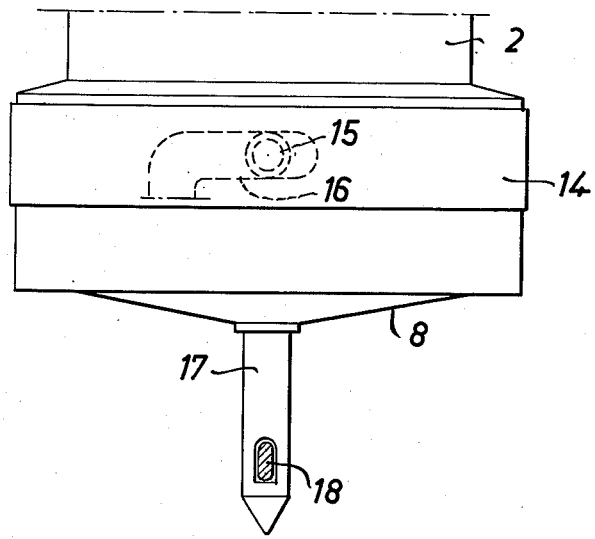
Fig. 2 is a fragmental elevation of the discharge valve according to Fig. 1, with only the bottom portion being shown, in part in a vertical cross-sectional view on the line II—II in Fig. 1.

In the drawings, the reference numeral 2 designates a cylindrical casing or box. The top end of said casing is closed by a threaded cover 4 together with a sealing or packing ring 5. The casing is provided with an inlet 3 for milk, which inlet could be provided in the cover 4 but in the embodiment illustrated is disposed laterally, at one side of the casing. In the bottom end of the casing an outlet 6 is provided, and an annular valve seat 7 is formed in said outlet. A screen unit 8 is provided immediately below said seat, and comprises a substantially great number of close-meshed sieves 9, made of wire netting or the like. The sieve number could be fourteen, for example, corresponding to a sieve opening of 1.41 millimeters, and in the embodiment illustrated fourteen individual wire sieves are used. Each individual wire sieve is provided with a central opening, and the wire sieves together with distance rings or spacers 10 are mounted on a central sleeve 11 which by means of radially extending arms 12 is connected to a ring 13 disposed at the circumference of the screen unit. Due to the spacers 10, there is formed small spaces between the wire sieves 9 in the central portions of the same, with both the top surface and the bottom surface of the screen unit being of convex shape. At the circumference, the wire sieves are in a tight contact with each other, and together with the ring 13 clamped against the lower edge of the casing 2 by means of a retaining sleeve 14 pushed onto the lower part of the casing and locked to the same by the aid of bayonet slot securing means, such as stud 15 and groove 16 (Fig. 2).

Figure 3:
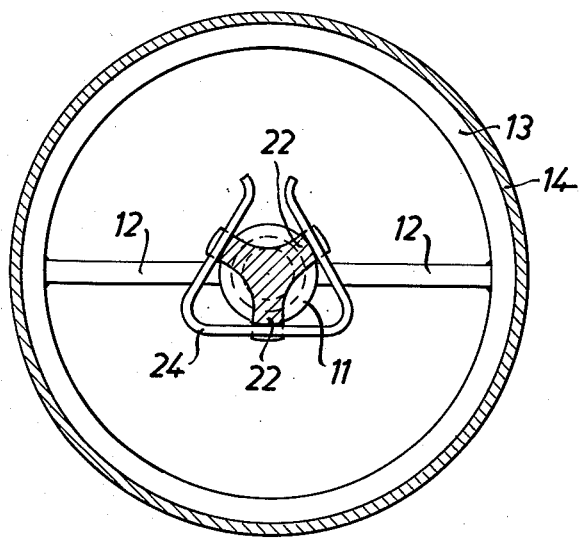
Fig. 3 is a horizontal cross-sectional view taken on the line III—III in Fig. 1.

A control rod 17 extends through the central hole of the sleeve 11, and the lower end of the control rod is engaged by one arm of a double-armed control lever 18 which is mounted on a pivot 19 supported by the casing 2 (by means not illustrated). The top end of the control rod 17 carries a ring 20 for guiding said rod in the casing. On a part of its length, which lies above the valve seat 7, the control rod 17 carries a valve element 21 which cooperates with the valve seat 7. The valve element 21 is disc-shaped and is provided with a central opening providing a clearance around a cross-shaped segment 22 of the rod, so that the milk can also pass centrally. In the embodiment illustrated, the disc-shaped valve element comprises a metallic ring surrounded and covered by an elastic material, such as rubber. The rubber section has a downwardly directed flange 21a at the circumference thereof sealing against the valve seat 7, as well as an upwardly directed flange 21b sealing against a shoulder which defines an auxiliary valve seat 23 provided on the rod 17. The cross-shaped segment 22 has its upper portion connected directly to the shoulder 23 and supports on its lower portion a driving member 24 for lifting the valve element 21. The driving member may be a wire bail or fork as shown in Fig. 3.

When the control rod 17 is lifted by means of the control lever 18, the shoulder 23 is first lifted from its sealing engagement along the flange 21b, so that the central passage is opened, and then the driving member 24 engages the bottom surface of the valve element 21 for lifting said element and the flange 21a from the seat 7, whereby the passage around the valve element is opened. Again, when the control rod 17 is moved downwardly by means of the control lever 18, the outer passage around the valve element is first closed and then the central passage is closed.

Since the valve seat 7 is disposed immediately above the top face of the screen unit 8 and since the valve element 21 is such as to form a minimum space against the top face of the screen unit, when in closed position, the volume and the weight of the liquid column which upon closure of the valve remains between the top face of the screen unit and the valve seat 7 together with the valve element 21, will be rather small. Moreover, since the number of wire sieves included in the screen unit is rather great and since the wire sieves are somewhat separated in the vertical direction, the cohesive force and the surface tension of the liquid trapped within the screen unit (that is within the meshes and between the wire sieves) will be of a value greater than that corresponding to the weight of the liquid column. Thus, the danger of dripping or after-flow of the milk is eliminated, also when the valve casing is moved laterally and is subjected to accelerative or retardation forces.

Since the wire sieves are mutually spaced in their central portions, the screen unit has a convex top and bottom faces, as already described. Due to this feature, the flow of milk traversing the screen unit when the valve is open, will be rather heavy in the central portion of the screen unit, while the compression of the screen unit in the circumferential portion will counter-act the flow of milk in that portion of the screen unit. Consequently, during discharge of milk through the valve, the liquid column or jet delivered from the valve will obtain a conical shape, with the cone being directed downwardly and the circumferential surface of the same being smooth and continuous. Thus, foaming of the milk during discharging as well as sprinkling or splashing is effectively prevented.

The invention is not restricted to the embodiment illustrated and described, many modifications being possible without departing from the spirit of the invention as appearing from the appendant claims.

I claim:
1. A discharge valve for discharging milk and other foaming liquids into vessels, comprising a casing having an inlet for the liquid and a downwardly directed outlet for said liquid, an annular valve seat in said outlet, a disc-shaped valve element in said casing above said annular valve seat and cooperable therewith, said disc-shaped valve element having a circumferential portion serving for engagement with said annular valve seat, a control rod extending centrally through said outlet, having one end operatively connected with said disc-shaped valve element and the opposite end operatively connected with external control means, and a screen unit mounted in said outlet, immediately below said annular valve seat, said screen unit comprising a package of a plurality of close-meshed sieves having at least their central portions separated from each other for providing small spaces trapping the liquid upon closure of the valve, each such sieve having a central opening allowing said control rod to extend therethrough and guiding the same.

2. A discharge valve for discharging milk and other foaming liquids into vessels, comprising a casing having an inlet for the liquid and a downwardly directed outlet for said liquid, an annular valve seat in said outlet, a disc-shaped valve element mounted in said casing above said annular valve seat and cooperable therewith, said disc-shaped valve element having a circumferential portion serving for engagement with said annular valve seat when in normal position, said disc-shaped valve element having a central opening, a control rod extending centrally through said outlet and through said central opening of said disc-shaped valve element and having a driving member for lifting said disc-shaped valve element from engagement with said annular valve seat, and a screen unit mounted in said outlet immediately below said annular valve seat, said screen unit comprising a package of a plurality of close-meshed sieves, each such sieve having a central opening allowing said control rod to extend therethrough and guiding the same, distance means being provided for separating the central portions of said sieves from each other and providing small spaces trapping the liquid upon closure of the valve, with at least the bottom face of said screen unit being convex.

3. A discharge valve for discharging milk and other foaming liquids into vessels, comprising a casing having an inlet for the liquid and a downwardly directed outlet for said liquid, an annular valve seat in said outlet, a disc-shaped valve element mounted in said casing above said annular valve seat and cooperable therewith, said disc-shaped valve element having a circumferential portion serving for engagement with said annular valve seat when in normal position, said disc-shaped valve element having a central opening, a control rod extending centrally through said outlet and through said central opening of said disc-shaped valve element and having a driving member for lifting said disc-shaped valve element from engagement with said annular valve seat, a shoulder on said control rod above said disc-shaped valve element for closing said central opening of said disc-shaped valve element when in normal position, and a screen unit mounted in said outlet immediately below said annular valve seat, said screen unit comprising a package of a plurality of close-meshed sieves, each such sieve having a central opening allowing said control rod to extend therethrough and guiding the same, and distance means for separating the central portions of said sieves from each other and providing small spaces trapping the liquid upon closure of the valve, at least the bottom face of said screen unit being convex.

4. A discharge valve for discharging milk and other foaming liquids into vessels, comprising a casing having an inlet for the liquid and a downwardly directed outlet for said liquid, an annular valve seat in said outlet, a disc-shaped valve element in said casing above said annular valve seat and cooperable therewith, said disc-shaped valve element having a circumferential portion serving for engagement with said annular valve seat, a control rod extending centrally through said outlet, having one end operatively connected with said disc-shaped valve element and the opposite end operatively connected with external control means, and a screen unit mounted in said outlet, immediately below said annular valve seat, said screen unit comprising a package of a plurality of close-meshed sieves having their central portions separated from each other for providing small spaces trapping the liquid upon closure of the valve, each such sieve having a central opening allowing said control rod to extend therethrough and guiding the same, said screen unit having a convex top face and a convex bottom face.

5. In a discharge valve for discharging milk and other foaming liquids of the type including a valve casing having a liquid inlet and a downwardly directed liquid outlet, a valve seat for the outlet, a valve element within the casing cooperable with the valve seat, external control means operably connected with the valve element for operating the valve element, and a screen packet positioned in the outlet immediately below the valve seat, said screen packet comprising a plurality of fine mesh sieves positioned above each other, spacer means between the central portions of adjacent sieves for holding the central portions spaced from each other to provide small spaces for trapping the liquid upon closure of the valve element, at least the under surface of the screen packet being of convex shape to concentrate conically the liquid discharge, and means maintaining the screen packet in the outlet.

6. The discharge valve as claimed in claim 5, further including means tensioning together said sieves at the periphery of the screen packet.

References Cited in the file of this patent

UNITED STATES PATENTS

| | | |
|---|---|---|
| 2,577,024 | Lundberg | Dec. 4, 1951 |
| 2,698,665 | Freeman | Jan. 4, 1955 |
| 2,772,120 | Olson | Nov. 27, 1956 |
| 2,785,881 | Dolan | Mar. 19, 1957 |